United States Patent [19]

Sherman

[11] Patent Number: 4,970,822
[45] Date of Patent: Nov. 20, 1990

[54] CONTACT POISON DELIVERY SYSTEM

[76] Inventor: Daniel A. Sherman, 1355 Bobolink Pl., Los Angeles, Calif. 90069

[21] Appl. No.: 428,601

[22] Filed: Oct. 30, 1989

Related U.S. Application Data

[63] Continuation-in-part of Ser. No. 255,614, Oct. 11, 1988.

[51] Int. Cl.$^5$ ............................................. A01M 25/00
[52] U.S. Cl. ........................................................ 43/131
[58] Field of Search ..................... 43/131, 132.1, 124

[56] References Cited

U.S. PATENT DOCUMENTS

| | | | |
|---|---|---|---|
| 2,328,590 | 9/1943 | Weil | 43/131 |
| 4,132,026 | 1/1979 | Dodds | 43/131 |
| 4,349,981 | 9/1982 | Sherman | 43/131 |
| 4,400,904 | 8/1983 | Baker | 43/131 |

Primary Examiner—M. Jordan

[57] ABSTRACT

This invention relates to the placement of insecticides in such a manner that precludes their contact by larger non target species and in a manner that isolates these insecticides form contact with food and other surfaces that may be contaminated by random application of insecticide products.

Specifically, the invention concerns itselft with the construction of a device that allows containment of the insecticide in a manner that will deliver a lethal dose to the target insect.

Additionally, the construction of the device entices crawling insects to its interior and thereby insures a more effective usage of a limited amount of insecticide concentrate.

And, the invention allows for unique and stable application of premeasured amount of insecticide product in a manner that insures the stability of the insecticide and thereby lengthens the useful killing life of the insecticide product.

8 Claims, 3 Drawing Sheets

CONTACT POISON DELIVERY SYSTEM

This application is a continuation-in-part of pending Ser. No. 255614 filed Oct. 11, 1988.

BACKGROUND OF THE INVENTION

Roaches and other insects have plagued mankind throughout history. They compete for food, soil food and other products with their waste, spread disease, and in general are destructive to the products and habitats that people utilize.

Over the years many ways have been devised to eliminate these creatures, and one of the most popular methods is to spread an insecticide in an area that the insect might crawl over and thereby poison it.

This of course also subjects non target species to possible contact with the insecticide and can lead to the contamination of food and surface that could be harmful to humans.

Another methods is to present a poisoned bait or foodstuff that is attractive to the insect and once again, by inducing the insect to eat the food, poison and kill it.

These methods have proven to be very effective, however insects tend to build immunities to insecticides when they are used over an extended period of time, thereby limiting the effectiveness of poisoned baits.

When areas are sprayed with poison, the insect must travel over a prescribed distance in order to allow enough of the insecticide to impinge upon the insect and kill it.

Since most insects travel in random patterns, the target insect may not in fact crawl over the treated area, or may not stay on a treated area long enough for the insecticide to take effect.

This can add to the resistance that insects build up after prolonged use of insecticides, and this resistance can be carried from generation to generation.

Additionally, in traveling, most insects will skirt a raised area, and prefer to travel in lines that present the least possible resistance to their travel paths.

The use of treated containment devises that present even marginal barriers to their travel can result in the insect passing the areas entirely, and following an alternative path, that has not been treated with the toxins.

And, many insects such as roaches prefer small, tight spaces that afford them some degree of protection, and will thereby avoid large openings or clear spaces in their search for food, harborage and water.

Taken into consideration in the development of the instant invention are certain basic characteristics of common insect species such as the cockroach.

These insects, which have a tendency to be vertically geotrophic in nature, and have a natural propensity to climb walls in their search for food and harborage, are best eliminated by a device that can be affixed tp such a vertical surface, and at the same time which can provide an environment that draws roaches into its interior which has been treated by an insecticide.

Additionally, the body of a roach is exoskeletal, which allows it to compress itself into extremely tight spaces that would normally by to small for other insects to travel through.

There are over 450 species of cockroach, and they can vary in size from adults that are over ⅜ inches in height to those that are less then 5 cm in height and most species of roach feel most comfortable when they find themselves in areas in which their entire body is in contact with the surrounding surfaces.

Additionally, roaches in the nymph stages can compress their bodies into spaces as tight as 5 microns high, and therefore a device that provides not only harborage, but that allows a family of roaches of varying height to enter is extremely desirable.

Also, being communal in nature, the roach is most likely lured into a surrounding that would provide an interior with a width that would become progressively smaller as the roaches entered, and could support dozens of their kind, but such a device also being of limited height to insure the feeling of security that contact with their entire outer shell would also provide.

And, by providing such a progressively smaller opening as the roach breached the device and traveled to its interior, we would add assurance that an entire colony, both young and adult, would enter the device and be poisoned.

The width of the device would then be defined by the range of possible varying sizes of roaches to be lured and destroyed, and the interior height would be defined by the variation of the species, which can reasonably be expected to range between 0.002 and one half inch in height.

A flared entrance would provide room for several roaches to enter at one time, and a ramp from the point of entrance to the poison containment area would allow the roaches to enter from a plane that was in direct contact with the exterior surface, and then lead up to a poison containment area without providing any obstacle or impedance for the roach as it traversed that device.

This construction would allow the maximum number of insects to enter and to commit themselves to a path, that in the case of contact insecticides, would insure a maximum kill.

Additionally, by providing the device with a method of exterior adhesion to a vertical surface, the efficacy of the device could be dramatically increased and the killing potential of the device greatly improved.

Also taken into consideration in the construction and design of the device is the need to prevent the insecticides contained therein from migrating from the position it has been originally applied, to to the exterior of the trap and into possible contact with non target species.

Since the viscosity of insecticides can vary greatly and their characteristics differ significantly relative to their ability to hold position after application, an interior designed with varying methods of insuring the stability of the insecticide applied therein is highly desirable.

This is demonstrated in the instant invention by the varied use of grooves that run in contradiction to the openings and insure that a viscous substance or gel material will remain stabilized and in place as heat and humidity change, even if the device has been placed vertically against a wall.

Or, in the use of a wick delivery system that provides a stable platform for the application of liquid insecticide under the same conditions.

Or, impregnation of the actual plastic that the device has been constructed of to provide a stable base of application under adverse conditions.

And finally, conventional coating of the interior in conditions that are highly stable and are not subject to radical changes in the surrounding environment.

Over the years several patent have been granted for insect traps or poison containment devices and these are demonstrated in the following U.S. Pat. Nos.; 4,563,836-Woodruff et al-Jan. 14, 1986, class 43/131, 4,228,613-Kalnasy et al-10/1980 class 43/131, 3,899,080-Brunda -8/1975 class 206/820X, 4,160,335-Von Kohron et al-Jul. 10 1979, class 43/131, Kirk-4,807,392-Feb. 28, 1989, class 43/131, McMullen-4,217,722-Aug. 19, 1980, class 43/131, Karifiol-2,138,926, Dec. 6, 1939, class 43/131, Andric-4,709,504-Dec. 1, 1987, class 43/131, Davies-4,423,564-Jan. 3, 1984 class 43/131, Cohen 4,819,371-Apr. 11, 1989, class 43/131 and Weil 2,328,590-Sept. 7 1943, class 43/131.

While these inventions advanced the state of the art in poison containment and delivery, they were deficient in that they did not take into consideration the travel habits of insects such as the roach, they did not provide ease of access for the insects by being flush with the surrounding surfaces, they did not provide for inherent methods of mounting the device to vertical surfaces, they did not provide limited interior heights to insure contact with the insects body, they did not provide varying methods of holding an insecticide in place under adverse conditions, the did not provide a method of funnelling numerous insects into a confined poison containment area and, did not provide a environment that was naturally attractive to a wide variety of crawling insects.

The instant invention deals with all of these problems, insures that the insect will be subjected to the proper dosage of insecticide, and that the target insect will be provided with an attractive harborage that entices it to its demise.

Additionally, the instant invention provides a safe and effective, low cost method of placing insecticides in areas that might be in proximity to children, pets or wildlife.

Further, the instant invention provides a flush entrance, leading to a poisoned chamber, that allows the target insect ease of entry and egress, and insures that it will not be encumbered as it travels in search of food and harborage.

And, the instant invention has a limited height, that insures contact with the poisoned surfaces contained therein, while having a flared opening to entice several insects to enter at the same time, thereby insuring the demise of the maximum number of target species present.

Further, the invention can be mounted to a vertical surface, and through the use of varying interior surfaces, doses the insect with an appropriate insecticide for the conditions of the surrounding environment, while preventing migration of the insecticide to exterior surfaces.

And, the invention will provide a poisoned chamber that is sufficiently distant from the exterior entrances and egress portals to minimize the risk to non target species, and to insure that the insecticide will not be removed by normal cleaning operation such was washing or dusting.

These and other novel and unique features of the instant invention will become apparent in the following description, and in conjunction with the accompanying drawings.

DETAILED DESCRIPTION OF THE DRAWINGS

Figure 1:
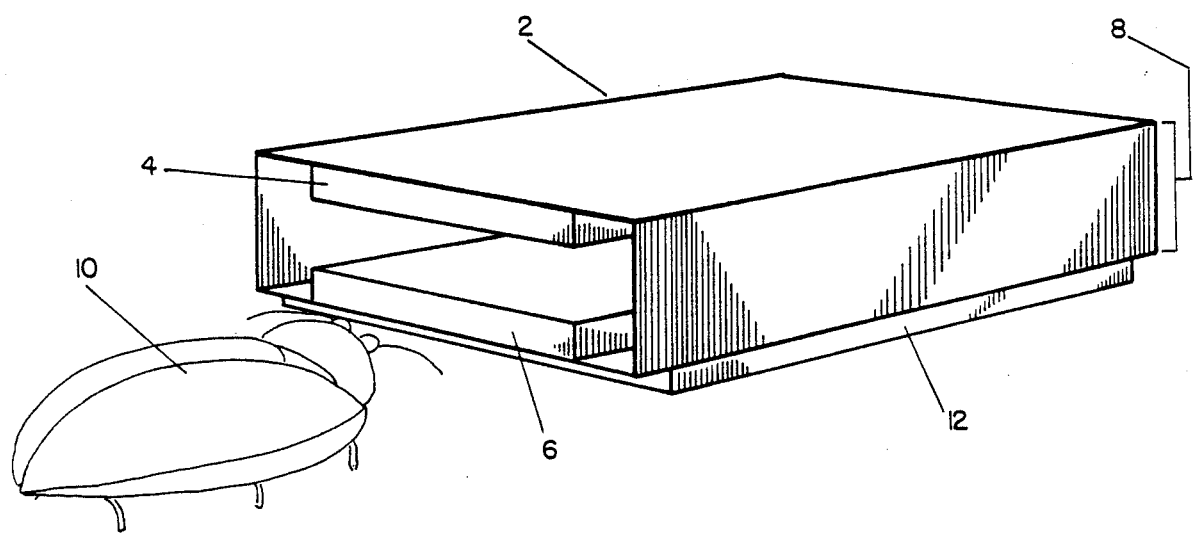
FIG. 1 depicts basic construction of the device showing the side walls and enclosing top and bottom. The use of an impregnated wick is shown as well as the placement of a piece of tape on the bottom exterior to hold the unit in place.

FIG. 1 shows the Contact Poison Delivery System generally as 2 and demonstrates the basic geometrical shape of the device which has an interior height 8 of between 0.002 inches and ½ inch. An insect 10 is seen approaching the device, which in this depiction is on a flat surface, and we see demonstrated the use of an internal wick poison delivery option depicted as 4 and 6 at the upper and lower interior sections of the device 2. As can also be seen, the insect 10 when entering the interior of the device 2 will encounter both wick segments 4 and 6 with the upper and lower portions of its body. Additionally depicted in this drawing is the use of an adhesive strip 12 which can hold the device in place when affixed to either a vertical or horizontal surface. It should be noted that the poisoned wicks 4 and 6 have been place intermediate to the entrance and egress portals and form a toxic chamber that the insect 10 must traverse in order to proceed from one portal to the opposing portal. The material used to construct the device 2 has also be made of sufficiently thin enough material so as to provide little or no barrier to the insect as it roams in search of food or harborage.

Figure 2:
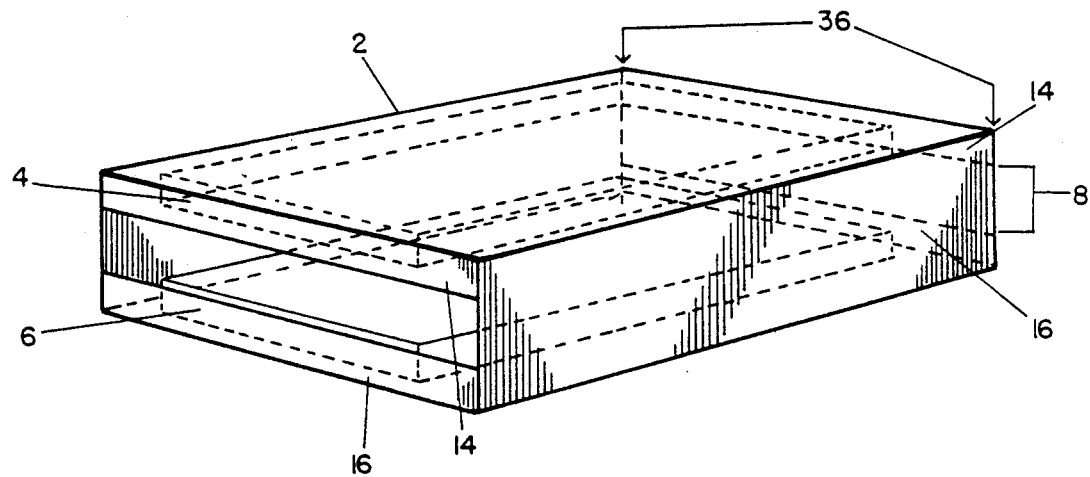
FIG. 2 shows the construction of the device with baffled lips at the front top and bottom entrance portals. The cut away shows the position of the impregnated wick in relation to the overall structure.

In FIG. 2 we see the Contact Poison Delivery System 2 in a cutaway dimensional drawing that show the perspective of the elements contained within the structure. The poisoned wicks 4 and 6 are shown as being intermediate to the two opposing portals. Added to the depiction are barriers 14 and 16 that shield direct contact with the wick 4.

The openings of the portals have been directed to the average size of the target insect and remain in the area of between 0.002 inches and ½ inch, the remaining area having been taken up by the wick 4. The overall outer dimensions of the device 2 are shown as 36 and represent sufficient space to allow several insect to enter and traverse the device 2 at the same time.

Figure 3:
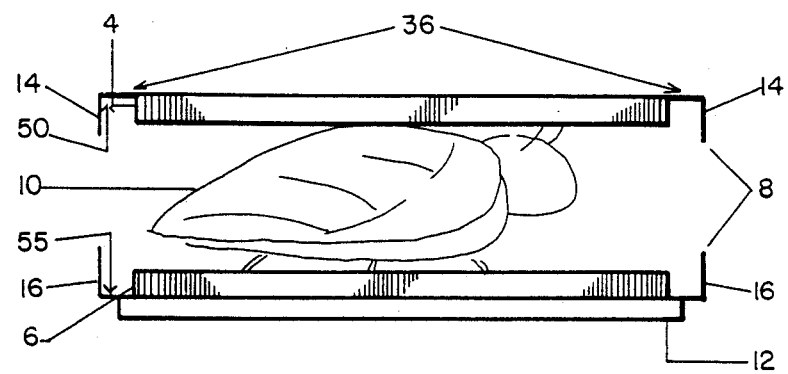
FIG. 3 is a side view that depicts an insect crawling through the device and demonstrates the contact of the insects back and legs with the impregnated wick. Also shown is the relation of the height of the wick to the baffled portals and additionally the placement of the tape on the bottom of the structure.
Figure 4:
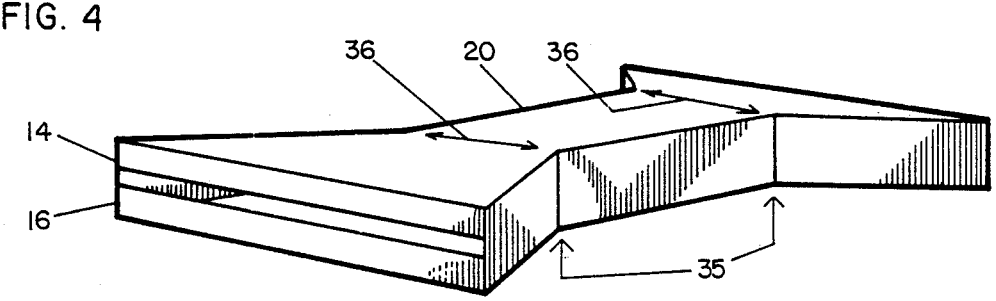
FIG. 4 is an alternative configuration that allows for an expanded entrance area that flares out from the basic containment structure.
Figure 5:
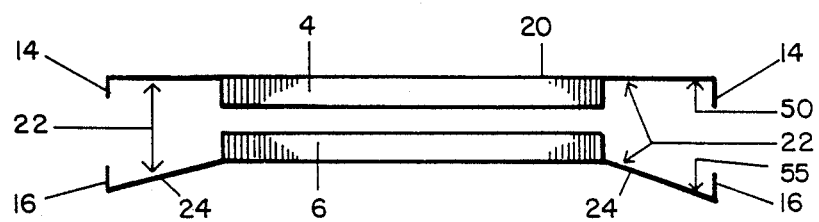
FIG. 5 demonstrates a side view of the alternative configuration showing a ramp type opening at the front leading to the containment area that houses the wick.
Figure 6:
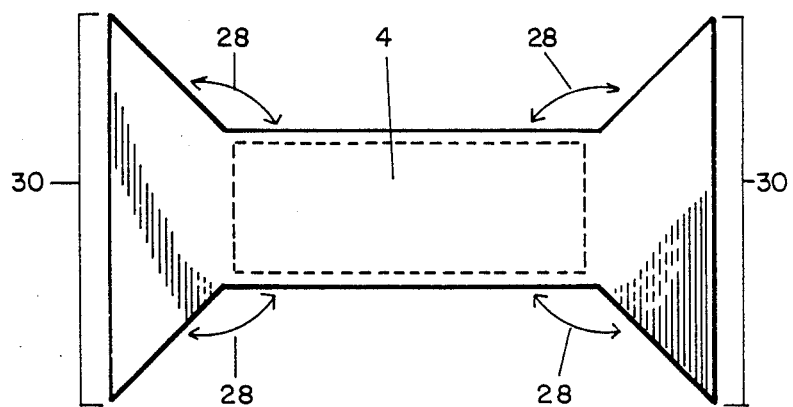
FIG. 6 is a top view of the alternative configuration that demonstrates the positioning of the poisoned surface within the structure and shows graphically the flared out entrance portals.
Figure 7A:
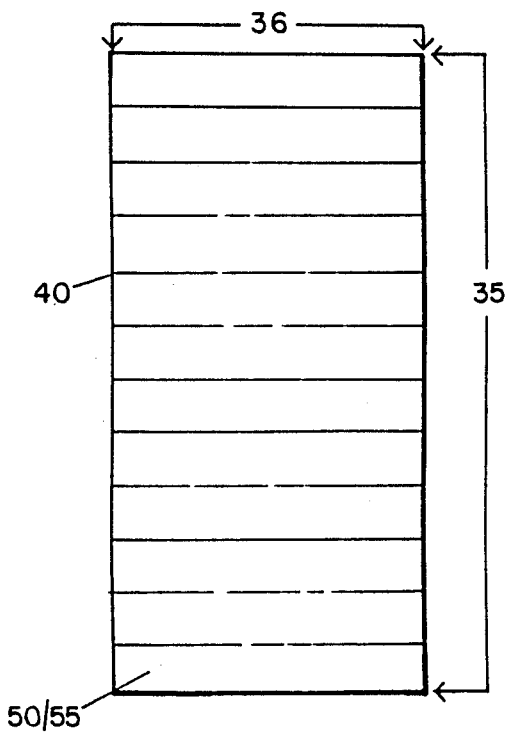
FIG. 7 demonstrates 4 methods of applying the poisoned insecticide to the interior of the housing at either the top of the structure, the bottom of the structure or both the top and bottom interior surfaces.
Figure 7B:
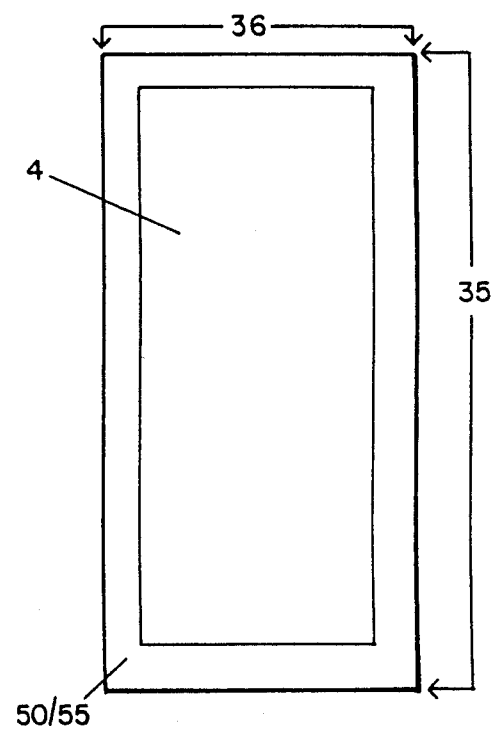
Figure 7C:
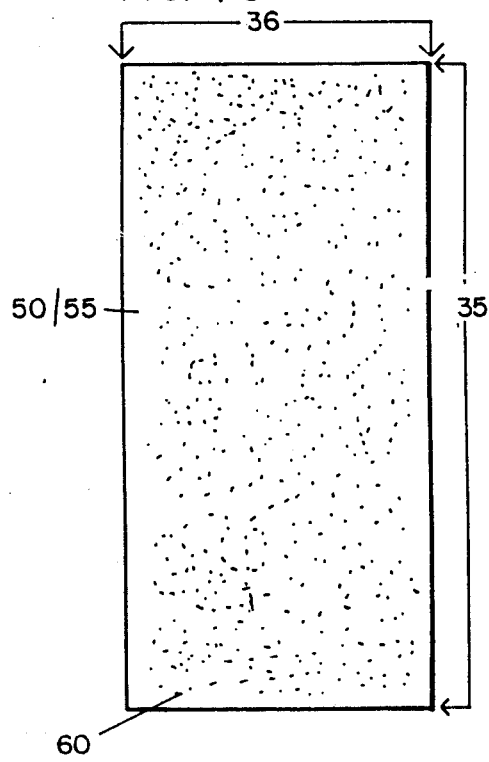
Figure 7D:
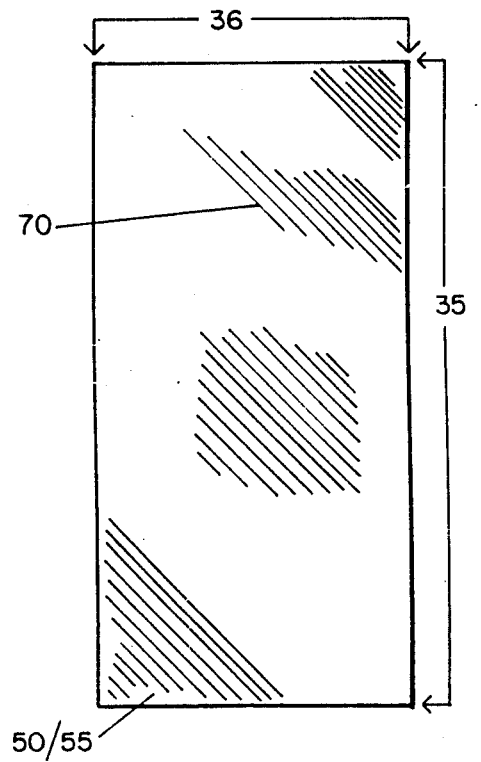

FIG. 3 demonstrates a side perspective of the Contact Poison Delivery System showing the insect 10 having moved to the interior of the device 2. In this case poisoned wicks 6 and 4 have been placed intermediate to the opposing portals. The relationship between the insect 10 and the portals 8 are shown, and it can be seen that the insect must squeeze into the interior of the delivery system 8. The length of the wicks 4 and 6 are determined by the distance needed for the insect to travel over a poisoned surface and be killed, and this is depicted in the case of the wick placement as 36. With the use of insecticide products available today, this distance can be between ½ inch and 4 inches is length, and for the purposes of this disclosure, an intermediate placement of a wick or poisoned surface of this distance are disclosed to the reader. It should also be noted that the interior walls of the Contact Poison Delivery System are designated in this drawing as 50 and 55. These walls 50 and 55 may also be treated intermediate to the opposing portals, and the distance 36 as shown to have been built with a wick delivery system, may in fact be replaced by a poisoned chamber of the same relative distance as the wicks 4 and 6 as depicted whereby the surface itself has been treated by the toxic substance. If the wicks 4 and 6 have been eliminated, the height of the interior of the chamber would be reduced accordingly to allow contact of the insect 10 with at least one or more of the surfaces 50 and 55.

Also depicted in this drawing is the positioning of the holding tape 12 which allows the device to be placed in both a horizontal and vertical position on a surface, and thereby allow the device to intercept insects traveling on flat or vertical surfaces.

In FIG. 4 we see an expanded version of the Contact Poison Delivery System 2 now depicted as 20. The poison containment area is still located intermediate to the portals and contained within the boundaries of 36 and 35.

Optional baffle walls 14 and 16 are shown at the entrance and egress portals. The device 20 now contains a flared area to which no poison has been applied and which allows more insects to be intercepted, but which leads to the poison containment area intermediate to the openings.

In FIG. 5 we see the expanded device is a cutaway side view perspective. The relationship between the portals and the poison containment area is shown. And the wicks 4 and 6 have been placed in the poisoned area. A ramp 24 has been added to provide added harborage characteristics to the device and to allow more room at the point in which an insect must commit to entering the station. This distance is depicted as 22 and is shown as a decreasing inward slope culminating at the flat poisoned containment area. The area designated as 50 and 55 in this drawing contains no poison and allow the use of insecticides that might be repellent if places directly adjacent to the portals.

FIG. 6 is a depiction of the device 20 showing the relationship of the component construction. The initial entrance and egress portals have been expanded to 30 and are shown to have been flared out from the poison containment area 4. An angle 28 radiating from the poison containment area 4 is shown and the total relationship of the components of the device are clearly depicted.

In FIG. 7 we demonstrate the various methods of delivering the contact poison to the insect. All panels (1), (2), (3) and (4) are the interior top and bottom walls 50 and 55. The poison contact area has been designated by the dimensions within the area noted as 35 and 36 which correspond to the previous drawings. In FIG. 7 (1) grooves 40 have been etched into the walls 50/55 and the contact poison has been applied as a gel that fills these grooves. In FIG. 7 (2) a poison impregnated wick has been placed within the contact area to carry the insecticide in a liquid or powdered form for delivery to the insect. In FIG. 7 (3) the poison has been applied a an integral part of the construction of the structure itself and is designed to leach out through a capillary type action and onto the insect. In FIG. 7 (4) the insecticide has been coated directly on the surface in a manner similar to painting the interior walls 50/55 with the insecticide directly.

What I claim is:

1. A Contact Poison Delivery System for the elimination of crawling insects; said system being comprised of a tunnel structure: said tunnel having two vertical walls that range in height between 0.002 inches and ½ inches and that are in conjunction with two horizontal walls; said tunnel having portals for the entrance and egress of insects at opposing ends; said tunnel having a poison containment area intermediate to said portals; said poison containment area having been coated with a toxin capable of killing said crawling insect; said toxin having been applied to said containment area in a method appropriate for various conditions that said system may be placed in; said intermediate position of said poison containment area having a distance from said portals to which no poison has been applied; said distance from said portal flaring outward from said poison containment area to produce a entrance and egress portal of wider dimension than said poison containment area; said entrance and egress portal having a base that is flush with the surrounding exterior surfaces.

2. A Contact Poison Delivery System as in claim 1 that contains a wick that has been placed on either of the interior horizontal surfaces: said wick having been dosed with a toxic insecticide, the length of said wick being between ½ inch and 4 inches and having a width equal the interior distance of said horizontal walls.

3. A Contact Poison Delivery System as in claim 1 whose interior horizontal walls have been constructed with grooves running in a direction that opposes said portals; said grooves having been filled with a viscous gel capable of killing a crawling insect; said gel having been applied in said poison contanment area; said poison containment area being between ½ inch and 4 inches in length.

4. A Contact Poison Delivery System as in claim 1 whereby the material of construction of said system has been impregnated with a toxic insecticide that has the capability of leaching out and coating the body of an insect traveling through its interior.

5. A Contact Poison Delivery System as in claim 1 containing double sided tape that allows said system to be affixed to vertical and horizontal surfaces.

6. A Contact Poison Delivery System as in claim 1 who portals have been shielded by a vertical barrier to inhibit access to the poison containment area.

7. A Contact Poison Delivery System as in claim 1 whose exterior construction contains a ramp structure prior to the poison containment area that gives additional vertical access to insects entering through its portals while still providing isolation of said containment area.

8. A Contact Poison Delivery System as in claim 1; said system having a distance between said poison containment area and said portals; said distance being a direct and straight continuation of said vertical and horizontal walls; said continuation having not been treated with said toxic substance.

* * * * *